Figure 1:
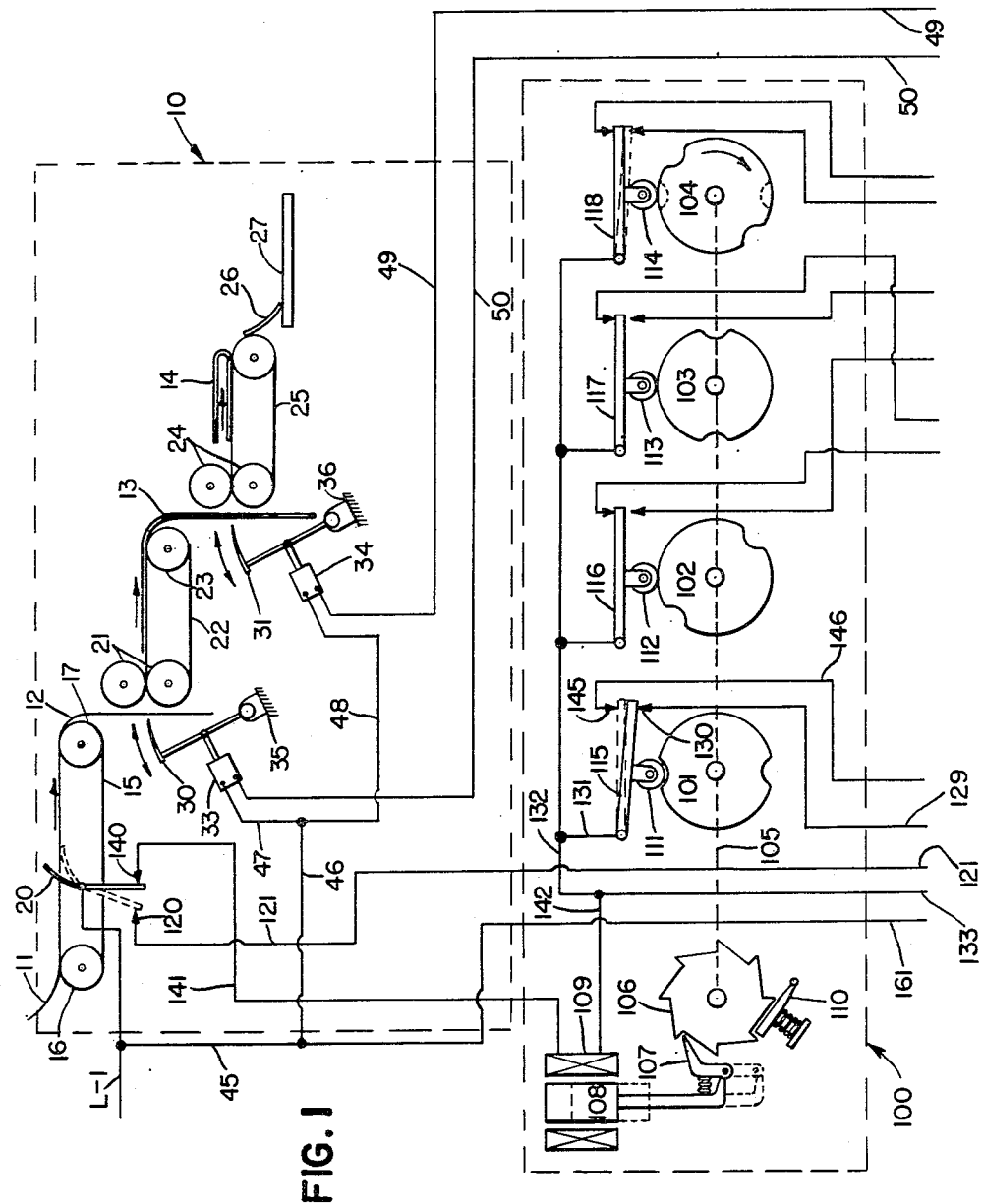
Figure 2:
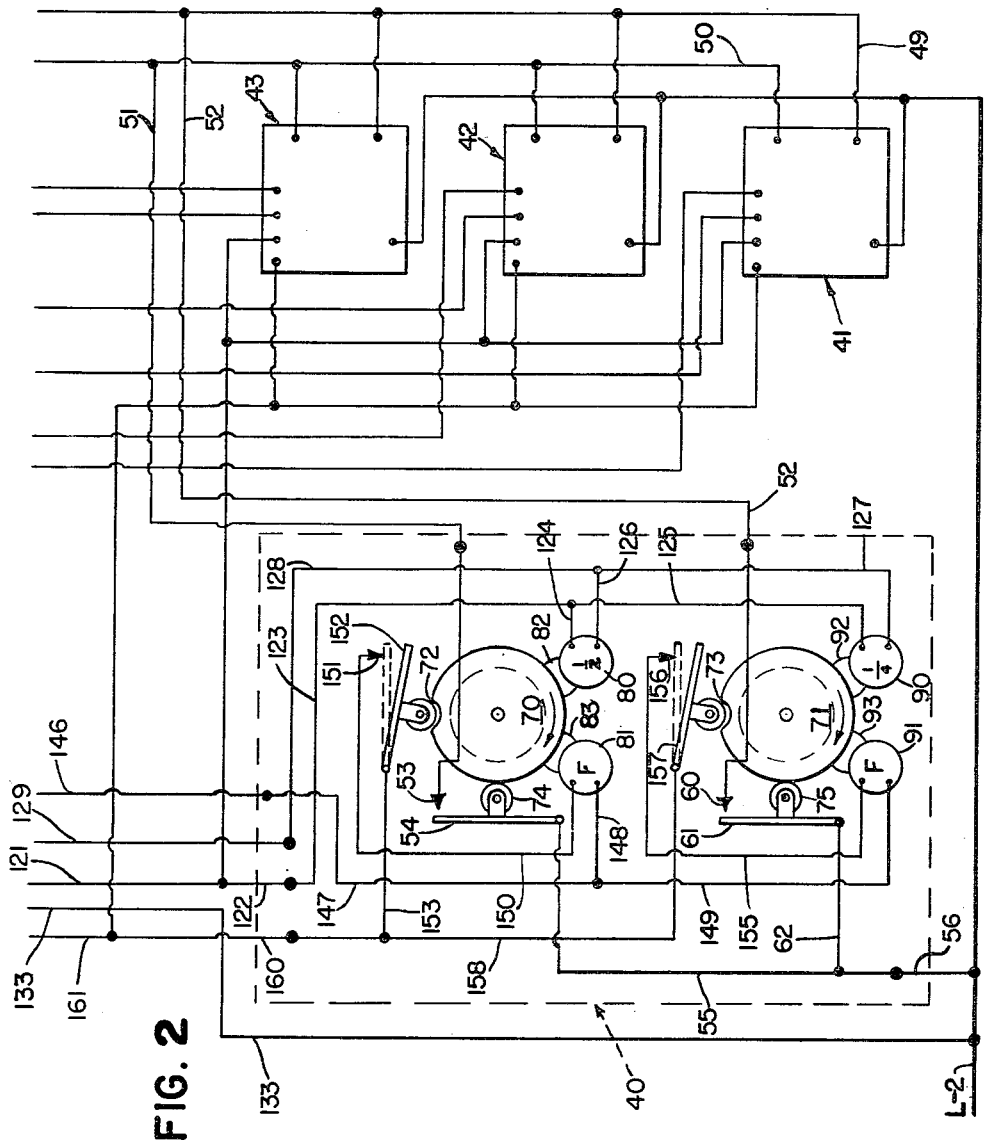

Jan. 15, 1957

C. L. MARTIN 2,777,689

FOLDER CONTROL

Filed March 26, 1953

2 Sheets-Sheet 1

CHARLES L. MARTIN
*INVENTOR.*

BY *Gifford S. Holmes*

Jan. 15, 1957  C. L. MARTIN  2,777,689
FOLDER CONTROL

Filed March 26, 1953  2 Sheets-Sheet 2

CHARLES L. MARTIN
*INVENTOR.*

BY *Gifford L. Holmes*

United States Patent Office 2,777,689
Patented Jan. 15, 1957

2,777,689

FOLDER CONTROL

Charles L. Martin, Moline, Ill., assignor to American Machine and Metals, Inc., East Moline, Ill., a corporation of Delaware Application March 26, 1953, Serial No. 344,762

2 Claims. (Cl. 270—81)

This invention relates to folder control and more particularly to an improved sequence controller which operates in conjunction with any suitable timing mechanism but preferably with that type shown and described in the patent application of Benjamin S. Kagan, S. N. 312,834, and entitled Timing Mechanism to Divide Sheets Proportionately.

The object of this invention is to provide an improved folder control including sequence controlling mechanism which operates in a quicker manner than those presently used.

A further object of this invention is to provide an improved sequence controller in a folding controller that obviates the requirement for a stepping switch device in combination with relays or solenoid switches as previously employed in the art.

In devices known and used hitherto it has been conventional practice to operate a measuring device in response to the passage of an article to be folded past a given point. This measuring switch would then control a sequence controller which would operate a relay into energized position while measuring the article to be folded.

After the piece passed the measuring device, the switch controlled thereby would be opened to thus cause the relay to drop out to complete the folding operation and simultaneously operate the stepper device to set up control for the next relay for measuring and controlling the folding operation on the next following piece.

It has been discovered that solenoid and relay devices do not always operate in dropping out in the same interval of time. In other words, it has been observed that if the current is at a high value in the solenoid winding at the time that the control switch is opened that a residual magnetism remains in the iron in the relay or solenoid. This magnetism must dissipate with time and accordingly the relay will drop out slowly when this breaking current is at a high value. When the breaking current is at a relatively low value as the alternate current passes through zero, for example, the timing of drop-out will be quite short. This variance in drop-out time results in inaccuracies in the folding operation of several inches from the desired folding time. It has been found to be impractical to so tension an armature on a relay or solenoid to give a quicker drop-out under different variations of the breaking current inasmuch as this spring tension needs be overcome when the relay pulls in and accordingly, the overall dimension and cost of such device is out of proportion to the utility of the partial correction of function attained.

In my improved controller, to be described below, I operate a sequence controller so that the critical time of changeover from measuring to setting up for operation of the folding machine is such that this changeover always occurs with a pulling in of a relay or solenoid armature, or the like. Inasmuch as the average 60 cycle current can cause no more than 1/120 of a second delay in the pull in, the measuring and folding function is rendered much more precise than has been possible in the prior art machines. In these prior art machines it has been found that relay drop-out may vary a large fraction of a second, and accordingly it is seen that my improved device is several times more sensitive than these prior art devices inasmuch as it will function in a very small fraction of a second.

Other objects and advantages of my invention reside in the details of construction and the arrangement of parts and will be either obvious or pointed out in the following specification and claims.

In the drawings:

Figure I is a diagrammatic view of a folding machine and a sequence controller therefor, and, Figure II is a diagrammatic view of four folding controllers and the wires thereof connect with the wires of Figure I to render the entire structure unitary.

Referring more in detail to the drawing, a folding machine is generally indicated at 10. This machine in conventional folding machine practice comprises a series of conveyor belts or tapes operating upon rollers in series. In the several stages through the folding machine flat sheets or the like are forced between rollers by folding blades to affect one or more folds in the sheets. In the diagrammatic illustration, here shown, the sheets are folded into halves and quarters.

The folding machine 10 is adapted to receive a series of sheets 11, 12, 13 and 14, and as many more as are fed through a conventional ironer, for example. It is not essential that this folding machine be attached to an ironer but may be remote therefrom, but it may receive ironed objects directly from an ironer for folding, if desired. The sheet 11 passes down upon parallel tapes 15 carried upon driven rolls 16 and 17. A measuring finger 20 extends upwardly between the tapes 15 and is adapted to be depressed into the dotted line position when the leading edge of the sheet 11, for example, engages the measuring finger 20. In the position shown in the drawing the sheet 12 has just passed the measuring finger 20 and the finger has snapped up from its dotted line position to the full line position under the influence of a spring or gravity or otherwise as desired or suitable. The sheet 13 has passed through rolls 21 and is being delivered along tapes 22 over a driven roll 23 and thence down towards roll 24. The sheet 14 has passed through roll 24 and is being carried by tapes 25 towards a delivery chute or plate 26 where it will be delivered to a receiving table 27.

The folding function is performed by a half fold folding blade 30 and quarter fold folding blade 31 in the example shown. As will be observed from the description below, the folding points may be selected by suitable gearing or drive mechanism in the folding controllers to affect folds at any desired point, for example, at the 1/3 and 2/3 points, or at other points.

The half folding blade 30 may be operated by a one revolution clutch 33, for example, and the one-quarter folding blade 31 may be operated by one revolution clutch 34. It is to be understood that the blades can be operated electromagnetically, hydraulically, pneumatically or mechanically without departing from the spirit of this invention. The blades 30 and 31 are suitably pivoted on supports 35 and 36 which may be frame members of the folding machine, for example.

The operation of the folding blades 30 and 31 is controlled by four folding controllers in the present example. It is to be understood that one or more folding controllers can be utilized within the scope of this invention, but it is preferable, where the sheets 11, 12, 13 and 14 may be of varying length, for example, from over 120 inches down to 25 inches, more or less, that the dimensions of the folder 10 would be such as to accommodate the longest sheet encountered, for example, 10 ft. but there would need be a number of folding controllers to accommodate the shortest pieces to be folded through the machine. Accordingly, if the longest piece were 10 ft. and the shortest piece were 2 ft. it is possible with four folding controllers to accommodate the same if the pieces are spaced at least 6 inches apart as they are fed into the folding machine. To assure proper spacing, the folding machine, when attached to an ironing machine, can be operated at a speed somewhat in excess of the speed of the ironer so that pieces will be spaced somewhat as the folding machine tapes 15 carry the pieces away from the ironer. By way of example, if the ironer is run at 100 ft. a minute, the folding tapes 15 and following tapes may run at a somewhat higher speed for example 120 ft. per minute and even with a 2 ft. piece this six to five ratio of spacing will be obtained. Accordingly, it is seen that I have provided a device further for folding not only long pieces fed in close succession but also means for folding short pieces fed in close succession to an ironing machine to which my improved folding controller may be applied.

As mentioned above, four folding controllers 40, 41, 42 and 43 have been shown. Inasmuch as they are all identical in construction only one of them will be described in detail. For still further detail of the folding controllers reference may be had to the above mentioned Kagan case, S. N. 312,834.

The blade actuators 33 and 34 are controlled by the folding controllers 40, 41, 42 and 43 in a manner now to be described. The controllers 33 and 34 are both energized from line wire L–1 through a wire 45, wire 46, wires 47 and 48, wires 49 and 50 and wires 51 and 52 to the half speed and quarter speed portions respectively of the folding controller 40. When a contact 53 is engaged by switch arm 54 a circuit is completed from wire L–1 through wires 45, 46, 47, 50, 51, contact 53, blade 54 and wires 55 and 56 to the line wire L–2. Accordingly, upon engagement of contact 53 with blade 54 the one revolution clutch on the actuator 33 causes the folding blade 30 to first advance to move the sheet 12 between the rollers 21 and then retire back to the position shown in preparation for receiving another sheet for folding.

The folding blade operator 34 for making the quarter fold is energized by contact 60 and switch blade 61 when they are in engagement through the following circuit. From line wire L–1 through wires 45, 46, 48, 49, 52, contact 60, blade 61, wire 62 and wire 56 to the line wire L–2. This circuit will cause advance and retiring movement of the folding blade 31 in an identical manner to the operation of the half folding blade 30 as described above.

The engagement of contact 53 with blade 54 controlling the half folding of sheets, and contact 60 and blade 61 controlling the fourth folds is under the influence of driven cams 70 and 71 having detents 72 and 73 respectively which when they pass rollers or the like 74 and 75 attached to switch blades 54 and 61 respectively cause a momentary closure of contact 53 and blade 54 for the half fold controller 33 and contact 60 and blade 61 for the quarter fold controller 34. The controllers 33 and 34 may be of a type which will self-energize until completing a revolution in a manner well known in the art so that the contacts in the controller 40 above described need be only momentary. The cam 70 is driven by a pair of motors 80 and 81 through suitable overrunning clutch mechanisms 82 and 83 respectively. The motor 80 turns the cam 70 at one-half of the speed that the motor 81 turns the same. Only one of these motors is energized at a time and accordingly, the overrunning clutches 82 and 83 permit the other motor to stand idle while the one is driving the cam 70. As will appear later, the half speed motor 80 drives the cam 70 from the position shown when the measuring finger 20 in the folding machine 10 is depressed into the dotted line position. After the measuring finger 20 snaps up to the full line position shown the full speed motor 81 will be energized through wiring and controls to be described hereinafter.

The cam 71 for controlling the quarter fold control device 34 is driven by a ¼ speed motor 90 and a full speed motor 91 through overrunning clutch mechanisms 92 and 93 which may be identical to those mentioned above in connection with the drive for the cam 70. When the measuring finger 20 of the folding machine 10 is depressed to the dotted line position the quarter speed motor 90 is energized simultaneously with the one-half speed motor 80. When the measuring finger 20 snaps back to the full line position shown the full speed motor 91 is energized together with the full speed motor 81 for the half fold control. For the position of the several parts in the drawing the sheet 12 has just been measured and the folding control 43 will be in operation for controlling the blade operators 33 and 34. A sequence controller 100 will have just moved its parts from the dotted line positions to the full line positions whereupon the controller 43 will have gone from fractional speed operation of its several cams to full speed operation. Such actuation will have placed folding controller 40 in position for measuring the sheet 11 which is shown as approaching the measuring finger 20.

The sequence controller 100 comprises a series of cams 101, 102, 103, 104, mounted on a shaft 105 and notched around by eighth turns by a ratchet 106 which is moved by a pawl 107 operated by an armature 108 under the influence of a solenoid 109. A keeper 110 may be spring biased into the position shown to prevent back rotation of the ratchet 106. For each operation the pawl 107 will engage the next succeeding tooth of the ratchet 106 so that when the armature 108 is drawn upward the ratchet 106 will move one-eighth of a turn. It is to be noted that the cams 101, 102, 103 and 104 each have two detents spaced 180° apart and the different cams are so positioned so that for each ⅛ revolution of the shaft 105 a detent will register with only one of the followers 111, 112, 113, and 114 of switch blades or switch actuators 115, 116, 117, and 118 respectively. Each switch blade cooperates with in-and-out contacts to set up circuits to be described hereinafter, only one of which will be described in detail inasmuch as they are all identical. It is to be noted that in actual practice enclosed snap action switches are preferred. However, for clarity, exposed slow action switches have been shown throughout.

When the leading edge of the sheet 11 engages the measuring finger 20, it will be depressed into the dotted line position and contact 120 will be closed. This will cause the solenoid 109 to be deenergized and permit the relay parts to drop into the dotted line positions. Such closure will complete a circuit for the half and quarter speed motors 80 and 90 respectively as follows: from line wire L–1 through the measuring finger 20, contact 120, wires 121, 122, 123 and 124 to the half speed motor, and 125 to the quarter speed motor; through wires 126 and 127 from the half and quarter speed motors respectively to a wire 128, through wire 129, contact 130, blade 115, wire 131, wire 132 and wire 133 to the other line wire L–2. Such a circuit will cause the half speed motor 80 and the quarter speed motor 90 to turn their respective cams 70 and 71 in a clockwise direction as long as the contact 120 is engaged by the measuring finger 20. Inasmuch as the sheet 11 will hold the measuring finger 20 in the dotted line position as long as it is over same, when it snaps up due to passage of the sheet 11 (as sheet 12 has previously passed) the measuring finger 20 will return to the full line position after the trailing edge of the sheet 11 has passed and thus will give an exact measure of the length of the sheet.

When the measuring finger 20 returns to the full line position, a contact 140 will be engaged by the measuring finger 20 and a circuit for the solenoid 109, and related circuits, will be set up for causing the cams 70 and 71 of the fold controller 40 to operate at full speed. By full speed is meant a speed that is proportional to the speed of travel of the sheets 11, 12, 13 etc. through the folding machine so that the folding blades 30 and 31 will be operated at proper time to cause folds into halves and quarters as pointed out above.

With the measuring finger 20 in the position shown after having measured a sheet the circuits will obtain as follows: from line wire L–1 through measuring finger 20, contact 140, wire 141, solenoid 109, wire 142 and wire 133 to line wire L–2. This will cause the armature 108 to be attracted instantly by the solenoid 109 out of the dotted line position into the full line position shown and thus notch around the ratchet 106 one-eighth of a turn. Such notching around will rotate the shaft 105 and the upper detent of the cam 101 will move 45 degrees in a clockwise direction which will move the switch blade 115 into engagement with an upper contact 145. From this point it is more ready to trace the circuit from line wire L–2 up to line wire L–1. A circuit through contact 145 will be completed to the full speed motors 81 and 91 of the controller 40 as follows: from line wire L–2 through wires 133, 132, 131, switch blade 115, contact 145, wires 146, 147 and 148 to motor 81 and wire 149 to motor 91 through wire 150, contact 151, running switch blade 152, wire 153 from the half speed timing portion of the controller 40; through wire 155, contact 156, switch blade 157 of a running switch of the quarter speed timing mechanism and a wire 158 which joins wire 153 from the half speed timing portion of same. The wires 153 and 158 connect through wires 160, 161 and 45 back to line wire L–1 which completes the running circuits to the full speed motors 81 and 91 of the folding controller 40.

It is to be noted that contact 151 was engaged by running switching blade 152 which occurs immediately when the cam 70 is rotated in a clockwise direction. Hence once started and with the contact 145 in engagement with the blade 115 in the sequence controller 100, the cam 70 will make one complete revolution and shut itself off through the action of this running switch. During this revolution the detent 72 will register with the follower 74 of the switch blade 54 controlling the half fold controller 33 in a manner described above.

It is also to be noted that in the quarter speed controller the running switch blade 157 engaged the contact 156 which likewise occurs immediately the cam 71 is rotated from the position shown, which is in a clockwise direction in this diagrammatic arrangement. When the detent 73 registers with the cam follower 75 the quarter fold controller 34 will be operated in the manner described above.

The cam 102 would be placed into operative position similar to the position of cam 101 when the ratchet 106 is rotated 45 degrees. Hence the piece to be folded following the piece 11 would be controlled by the cam 102 which controls identical circuits through folding controller 41. Likewise on subsequent movements of 45 degrees, each of the cams 103 and 104 would cause operation of folder controls 42 and 43 respectively. Thereafter, the program would begin with the cam 101 in ccontrol which would set up folding controller 40 for operation in the manner above described.

Accordingly, it is seen that I have provided an improved folding control which affects its changeover from measuring to operation of the timing mechanism or folder controlling mechanism with a pull-in of the relay or the like whereby a minimum of error is obtained between the actual measurement and the actual operation of the folding device. It is obvious that other modifications and adaptations of my invention may occur to others skilled in the art. Accordingly, it is to be understood that I am not to be limited in my invention only to the diagrammatic form shown and described but by the spirit and scope of the appended claims.

I claim:

1. A control system for article folding apparatus comprising article folding means; a plurality of timing devices each operable to selectively control the operation of said folding means and being of the type having first and second rates of operation; sensing means responsive to the lengths of the articles being folded and adapted to control the rates of operation of said timing devices; terminal means adapted to be connected to a source of electrical energy; and a sequence controller operable to sequentially transfer control by said sensing means to each of said timing devices for successively fed articles such that one timing device controls the operation of said folding means for a single article being folded, said sequence controller including a solenoid electrically connected to said terminal means through said sensing means for controlled energization thereby and sequence switch means connected to said solenoid for actuation thereby, said solenoid being operable upon energization to actuate said sequence switch means to permit the timing device associated at that time with said sensing means to shift from one rate of operation to another and to cause control by said sensing means to be transferred to another of said timing devices.

2. A control system for article folding apparatus comprising article folding means; a plurality of timing devices each operable to selectively control the operation of said folding means and being of the type having first and second rates of operation; sensing means responsive to the lengths of the articles being folded and adapted to control the rates of operation of said timing devices; terminal means adapted to be connected to a source of electrical energy; and a sequence controller of the type having one sequence switch having first and second positions included therein for reach of said timing devices and a solenoid operably connected to the sequence switches for actuation thereof, each of said sequence switches being operable in its first position to permit said sensing means to produce said first rate of operation in the timing device associated therewith and being operable in its second position to permit said sensing means to produce said second rate of operation in said associated timing device, said solenoid being electrically connected to said terminal means through said sensing means for controlled energization thereby and being operable when energized to actuate said sequence switches to cause one of said switches to assume its first position and the remainder of the switches to assume their second positions thereby causing sequential transfer of control by said sensing means to each of said timing devices.

References Cited in the file of this patent

UNITED STATES PATENTS

| | | |
|---|---|---|
| 1,090,301 | Hawkins | Mar. 17, 1914 |
| 1,576,155 | Stevens | Mar. 9, 1926 |
| 2,458,544 | Watson | Jan. 11, 1949 |
| 2,494,520 | Riggen | Jan. 10, 1950 |
| 2,516,454 | Doran | July 25, 1950 |
| 2,528,434 | Howse | Oct. 31, 1950 |
| 2,652,246 | Kagan | Sept. 15, 1953 |
| 2,659,598 | McLagan | Nov. 17, 1953 |